United States Patent
Nelson et al.

(10) Patent No.: US 6,182,556 B1
(45) Date of Patent: Feb. 6, 2001

(54) DEVICE FOR MAKING MOLDED CONFECTIONERY PRODUCTS

(75) Inventors: Roy B. Nelson; David Howard Nelson, both of York (GB)

(73) Assignee: Nestec S.A., Vevey (CH)

(*) Notice: Under 35 U.S.C. 154(b), the term of this patent shall be extended for 0 days.

(21) Appl. No.: 09/598,715

(22) Filed: Jun. 21, 2000

(30) Foreign Application Priority Data

Jun. 22, 1999 (EP) .................................................. 99202000

(51) Int. Cl.$^7$ ................................ A23L 1/00; A47J 37/00; A23G 3/00
(52) U.S. Cl. ................................. 99/331; 99/339; 99/348; 99/352; 99/355; 99/517; 366/194; 366/195; 366/144; 366/312
(58) Field of Search ................................ 99/326–333, 339, 99/340, 348, 349, 352–355, 452–455, 483, 484, 516, 517; 165/94, 109.1, DIG. 80; 366/194–196, 144–149, 309–312; 426/660, 515–519, 520, 804; 62/342, 343

(56) References Cited

U.S. PATENT DOCUMENTS

| | | | |
|---|---|---|---|
| 2,064,131 | * 12/1936 | Tuscan et al. | 99/348 X |
| 2,188,551 | * 1/1940 | Kaltenbach et al. | 366/312 X |
| 3,255,815 | * 6/1966 | Smith | 366/147 X |
| 3,669,030 | 6/1972 | Waters | 99/348 X |
| 3,908,032 | 9/1975 | Didelot et al. | 426/660 |
| 4,126,177 | * 11/1978 | Smith et al. | 165/94 X |
| 4,279,295 | 7/1981 | Duckworth | 165/94 |
| 4,311,722 | * 1/1982 | Vink et al. | 426/60 |
| 4,753,816 | * 6/1988 | Vink et al. | 426/660 |
| 5,167,981 | 12/1992 | Mergelsberg et al. | 426/660 |

FOREIGN PATENT DOCUMENTS

| | | |
|---|---|---|
| 40 19916 A1 | 1/1992 | (DE) . |
| 0 400 700 | 12/1990 | (EP) . |
| 0 681 786 A1 | 11/1995 | (EP) . |
| 2 249 934 | 5/1992 | (GB) . |

* cited by examiner

*Primary Examiner*—Timothy F. Simone
(74) *Attorney, Agent, or Firm*—Pennie & Edmonds LLP

(57) ABSTRACT

The invention relates to a method for making confectionery products and an apparatus for use in the method. The apparatus includes a hopper for mixing the ingredients of a confectionery mix with water to provide a confectionery-based slurry, a device to deliver the confectionery-based slurry from the hopper to a scrape evaporator, and a scrape evaporator. The scrape evaporator includes at least a substantially cylindrical upper cooking section having a first surface at a first temperature for receiving the slurry from the hopper and first scrapers. The first scrapers remove the slurry from the first surface and urge the slurry towards a substantially cylindrical lower cooking section having a second surface at a second temperature and second scrapers. The second scrapers remove the slurry from the second surface and urge the slurry to a lower section of the scrape evaporator wherein the lower section has a tapered configuration and a helical rotary device to urge the slurry out of an exit of the scrape evaporator. The apparatus also includes a device for controlling the temperature of the upper cooking section, and the lower cooking section. The scrapers are secured to a central shaft that extends along the height of the scrape evaporator.

19 Claims, 1 Drawing Sheet

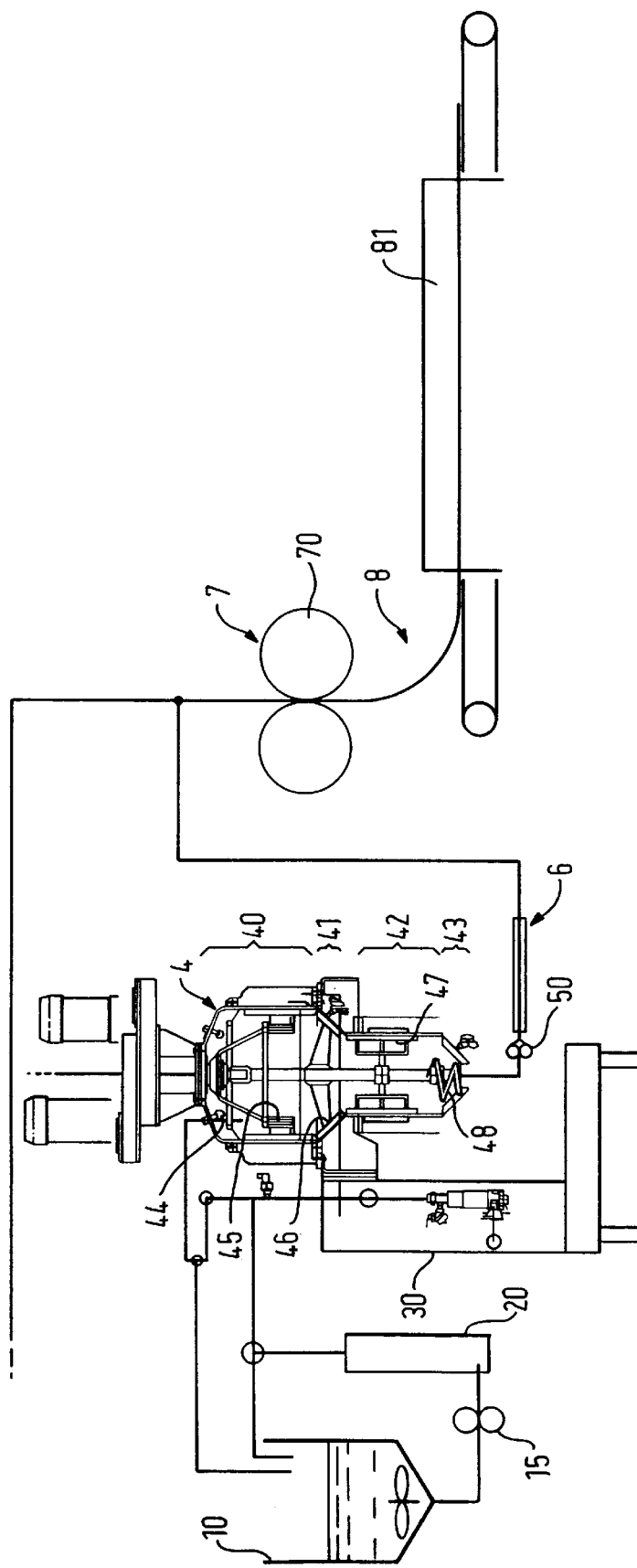

DEVICE FOR MAKING MOLDED CONFECTIONERY PRODUCTS

FIELD OF THE INVENTION

The present invention relates to a device for making sugar-based confections, in particular sugar-based hydrocolloid confections having a total solids content above about 75 percent. The invention also relates to a method for manufacturing sugar-based confections utilizing the device of the invention.

BACKGROUND AND PRIOR OF THE INVENTION

Sugar-based confections include, for example, gums; jellies; high boils; low boils; fat; and milk-based confections such as toffees, fondants, fudges and caramels. Gums and jellies are hydrocolloid based confectioneries in which hydrocolloid ingredients determine the shape, stability, and texture of the confection. Examples of gums and jellies include, winegums, hard pastilles, soft and foamed gums, fruit leathers, lemon slices, Turkish delights, gummy bears, jelly babies, and the like. By varying the hydrocolloid system in the confection it is possible to obtain considerable variation in the texture of the confection.

Traditionally, sugar-based hydrocolloid confections are manufactured by preparing a fluid mass having a medium to high amount of total solids, i.e., about 60 to 80 percent total solids (TS), from a liquor or slurry of confectionery-based ingredients that typically includes sugar and optionally one or more of hydrocolloids, fats, milk solids, and the like and cooking the slurry. The resulting cooked fluid mass is then deposited into molds. Typically, the molds are made of starch powder.

The liquor is prepared from a sugar syrup, for example, by metering the proper amount of sugar and other ingredients into water and mixing the ingredients to make a cold-mix slurry. The cold-slurry mix is then heated until the ingredients are fully dissolved and then further cooked by open pan boiling or alternatively by other means such as, for example, in a jet cooker, coil cooker, plate or tubular heat exchanger, or cooker extruder. The cooking time and specifics of the operation will vary depending on such factors as, for example, the type of cooking equipment, the ingredients in the formulation, and the concentration of the ingredients.

After the slurry has been cooked starch molding is used to reduce the moisture content of the final product and to shape the product to its final configuration. The technique of starch molding involves forming mold impressions in powdered starch and depositing the cooked mass or slurry into the molds to form the confectionery products. The molds are then put aside and, generally, are placed in a drying stove to reduce the moisture content of the confectionery product to the desired level. The drying time may be up to several days depending on the product. The moisture content of the cooked mass is substantially higher than the moisture content of the final product. Typically, the moisture content of the cooked mass is between about 20 and 35 percent while the moisture content of the final product is typically between about 10 and 20 percent. This technique of manufacturing confectionery products is commonly known as the Mogul system and is the production method that is conventionally used to manufacture hydrocolloid-based confections with a high solids content, i.e., a total solids content above about 80 percent. Starch molding, however, can also be used to form sugar confectionery masses that are not hydrocolloid-based confections but have a high total solids content, such as, for example, high boiled sugar masses that typically have up to 5 percent moisture; sugar fondant masses that typically have up to 10 percent moisture; and low boiled caramel, fudge, and chew masses that typically have up to 12 percent moisture. GB 2 249 934 A discloses a method for producing a starch jelly confectionery product using the starch molding technique. The traditional starch molding method, as briefly described above, however, is costly due the fact that the process is time consuming, energy consuming, labor intensive and requires large amounts of storage space.

Another technique used to manufacture confectionery products is known as starchless molding. Starchless molding can be used to make various types of confections. The starchless molding method is best suited for producing hydrocolloid-based confections that have a relatively low solids content because the high viscosities of more concentrated liquors prohibits efficient depositing. For example, starchless molding can be used to make hydrocolloid-based confections with a solid content of less than about 85 percent. High-boiled confections with a higher solid content but that do not include gelling hydrocolloids to determine texture, however, may also be obtained with this method. In the starchless molding method the cooked mass has the same total solid content as the final shaped product. The cooked confection mass is deposited into series of teflon-coated molds or flexible silicone rubber or metallic molds that have been sprayed with a releasing agent. Typically, the molds are then passed through a cooling tunnel before the confectinery product is removed from the mold. Specific ejecting means are usually necessary to remove the shaped confectionery products from the molds. A wide range of confections may be produced by this method such as, for example, soft winegums, jelly bears, high-boils, low boils, caramels, fondants, fudges, and the like.

The starchless molding method, however, is restricted in scope to confections that contain hydrocolloids that have quick-setting properties, such as pectin, so that the hydrocoloid sets during the rapid cooling so that the confectionery product can be removed from the mold. The method is not applicable, or is less useful, for a large majority of hydrocolloids, such as gelatin and starch, that are slow to set. Another difficulty with the method is that it can be difficult to cleanly deposit the low moisture hydrocolloid liquors into the molds due to their high viscosity. Furthermore, removing the confectionery product from the molding can also be a problem unless sufficient release agent is used. The type of molds used in the process is also critical; generally, the mold must be a relatively flexible mold to facilitate the release of the shaped mass.

Thus, there remains a need for a method to make sugar-based confections that avoids the aforementioned drawbacks of the known methods.

SUMMARY OF THE INVENTION

The invention relates to an apparatus for manufacturing a concentrated confectionery slurry. The main component is a scraped-surface evaporator that includes at least a substantially cylindrical upper cooking section having a first surface at a first temperature for receiving the slurry from a hopper and first scrapers. The first scrapers remove the slurry from the first surface and urge the slurry towards a substantially cylindrical lower cooking section having a second surface at a second temperature and second scrapers. The second scrapers remove the slurry from the second surface and urge the slurry to a collection section having a tapered configuration. The scrapers are secured to a central shaft that extends along the height of the scrape evaporator. Helical rotary means are included to urge the slurry out of the outlet of the scrape evaporator. The apparatus also includes means for controlling the temperature of the upper and lower cooking sections.

The apparatus can also include a hopper for mixing ingredients of a confectionery mix with water to provide the confectionery-based slurry, and means to deliver the confectionery-based slurry from the hopper to the scrape evaporator.

The diameter of the upper cooking section is preferably larger than the diameter of the lower cooking section. The temperature of the first surface may be lower or higher than the temperature of the second surface. The temperature of first surface and the second surface may be between about 50 and 150° C. The first surface may be at a temperature between about 90 and 110° C. and the second surface at a temperature between about 100 and 120° C. or the first surface may be at a temperature between about 95 and 115° C. and the second surface at a temperature between about 105 and 115° C. The slurry may be delivered to the scrape evaporator by a jet sprayer that directs the slurry onto the surface of the upper cooking section.

The scrape evaporator may further include a substantially conical intermediate section between the upper cooking section and the lower cooking section having a third surface and third scrapers to remove the slurry from the third surface and urge the slurry towards the collection section. The intermediate section may be designed to allow additional additives to be added to the slurry. The apparatus may also include a pre-heating apparatus between the hopper and the scrape evaporator to heat the slurry to a temperature that ensures the confectionery slurry is a solution. Also, the apparatus may include a starch cooker between the pre-heating apparatus and the scrape evaporator at a temperature between about 10° C. and 150° C. and a pressure of between about 2 and 5 bars to gelatinize the slurry.

The helical rotary means may be a ribbon auger. The apparatus may also include a pump to pump the slurry from the exit of the evaporation housing to an in-line mixing device for mixing one or more additional additives with the slurry. The scrape evaporator may also be under reduced pressure. The apparatus may further include a set of chilled rollers to shape the slurry into individual confectionery products or a device to deposit the slurry in a plurality of molds. The molds may be received on a conveyor belt and chilled by spraying a coolant under the conveyor belt.

BRIEF DESCRIPTION OF THE DRAWINGS

FIG. 1 is a schematic illustration of an apparatus for carrying out the method of the invention.

DETAILED DESCRIPTION OF THE PREFERRED EMBODIMENTS

The present invention provides a method of making sugar-based confections that avoids the aforementioned drawbacks of the known methods. According to the invention it is possible to produce sugar-based confections covering a wide range of solid contents that can be molded. The method of the invention can also be used to produce sugar-based confections that contain a wide range of variety of hydrocolloids. The method of the present invention is particularly useful to prepare confectionery products that have a high sugar content and hydrocolloids. The method of the invention avoids having to use the starch molding process or significantly reduces the drying time in the starch molding process. The method of the invention produces sugar-based confections, especially hydrocolloid-sugar confections, in a cleaner more economical manner and is more energy efficient and involves less labor and time than prior art methods. The method of the present invention can also handle the extremely viscous mixtures that arise when some mixes of confection ingredients are cooked by conventional methods in conventional equipment. These viscous mixtures often causes flow problems and lead to pipes and the like becoming blocked.

The method of making sugar-based confections according to the invention involves gently dissolving the ingredients needed to make the confectionery product in water to form a confectionery-based slurry and then concentrating the confectionery-based slurry. The confectionery-based slurry is concentrated by applying the slurry onto a first hot surface at a first temperature, scraping the slurry off the first surface, moving the slurry onto a second hot surface at a second temperature, and scraping the slurry off the second surface. Applying the slurry to the first hot surface increases the total solids content of the slurry by removing moisture from the slurry. Applying the slurry to the second hot surface removes more moisture and increases the total solids content to the final value that is desired.

The confectionery-based slurry is prepared in the first step of the process by dissolving the ingredients needed to make the confectionery product in water. The confectionery-based slurry includes at least one or more sugars and may also include other ingredients such as hydrocolloids; colors; flavors; non-hydrocolloid gelling agents; oils; and food-acceptable acids such as citric acids, malic acid, tartaric acid, and the like. Preferably, the confectionery-based slurry includes one or more hydrocolloids.

In the context of the present invention, sugar means any carbohydrate comprising one or more saccharose groups. Sugars include, but are not limited to, sucrose; fructose; glucose; dextrose; lactose; starch hydrolysate syrups and maltodextrins; and carbohydrate alcohols such as sorbitol, xylitol, and the like. The sugar can be supplied in any form including, but not limited to, granulates, nibs, casters, icings, liquids, and molasses.

In the context of the invention, hydrocolloids means any hydrophillic colloidal material that can be used as an emulsifier, thickener, or gelling agent to impart texture, shape, and stability to the confectionery product. Hydrocolloids include, but are not limited to starch, pectin, agar agar (agarose), gelatin, gum arabic, xanthan gum, gellan gum, carrageenan, and derivatives of modified starches.

The ingredients may be dissolved in the water under cold conditions or the dissolution may include a heating step to facilitate dissolving the ingredients. It is important to heat carefully so as to obtain good dissolution of the ingredients and yet to avoid degrading heat-sensitive ingredients. When starch is added as an ingredient it is preferable not to gelatinizing the starch during the dissolution step. To avoid gelatinizing the starch the temperature may be limited, the type of starch may be limited, the moisture content of the confectionery-based slurry may be controlled, or the ingredients of the confectionery-based slurry may be controlled. Preferably, when starch is the ingredient, the temperature is kept below 105° C.

The confectionery-based slurry is then concentrated by cooking the slurry in a controlled step wise manner to evaporate moisture and gradually increase the total solids content of the confectionery-based slurry. The concentrating is carried out in at least two cooking phases. The slurry is first cooked in a first cooking phase wherein the confection-based slurry is applied to a first hot surface to boil off a substantial proportion of the moisture. Preferably, at least about 65 percent and more preferably at least about 75 percent of the moisture is boiled off in the first cooking phase. The slurry is then cooked in a second cooking phase wherein the confection-based slurry is applied to a second hot surface that cooks the confectionery-based slurry at a second temperature that is sufficient to boil off enough moisture to obtain the desired final total solids content. The first and second surfaces can be at any temperature. The temperature of the first surface and the second surface is typically between about 30 and 250° C., preferably between about 50 and 150° C. The temperature of the first surface may be higher or lower than the temperature of the second surface. Preferably, the second temperature of the second hot surface is higher than the first temperature of the first hot surface.

For example, the slurry may be concentrated by evenly distributing the slurry on the first hot surface at a temperature between about 90 and 110° C. while scraping the slurry off the surface and moving the slurry to a second hot surface at temperature between about 100 and 120° C. to evaporate a sufficient amount of moisture to reach the desired final solids content. The temperature ranges, however, will depend on such factors as the recipe, the desired final solids content, and the pressure. Preferably, concentrating the slurry to the desired final solids content involves applying variable shearing during scraping. Thus, the shear rate used to scrape the slurry from the surfaces may be different for each surface. Shear rate is a function of the velocity of the scrapers with faster scrapers associated with higher shear rates. Shear rates may be adapted to the changing viscosity of the slurry so as to affects the rate of heat exchange and turbulence in the slurry mass so that the desired degree of moisture evaporation is obtained more rapidly.

Preferably, the moisture is removed by cooking under reduced pressure. The reduced pressure can be obtained, for example, by using a vacuum pump. Reduced pressure facilitates removal of moisture. The removed moisture is vented to the atmosphere. Using reduced pressure advantageously reduces the residence time during cooking and allows the moisture to be removed at lower temperatures. In addition, sugar inversion is minimized when operating under reduced pressure. Sugar inversion is a reaction that causes disaccharide sugars to breakdown into two simpler sugars. Sugar inversion should be avoided since it modifies the final characteristics of the confectionery product. Operating under reduced pressure also minimizes the thermal degradation of hydrocolloids by hydrolysis or other chemical reactions. If the hydrocolloids degrade the gelling potential of the recipe may be spoiled and unwanted colors and flavors may develop.

In contrast to prior art methods, that apply a single cooking phase to concentrate the slurry, the method of the invention splits the cooking cycle into at least two heating phases. By using at least two cooking phases it is possible to prepare confections with the desired solids content and to eliminate the problems that occur, due to the increase in viscosity that occurs when a hydrocolloid confectionery mix, is cooked in a single cooking phase to the final solids content. The method also permits a wide variety of molding and depositing techniques to be used. The starch molding method is no longer required. By not requiring the starch molding technique the capital investment necessary to purchase the equipment needed for the technique is avoided and the need for costly storage space is reduced. The method of the invention is also cleaner and provides a more dust free method to produce the confectionery product compared to the starch molding technique. For example, medicated sweets can be produced without the threat of contamination from recycled starch as occurs with the traditional starch molding method.

The resulting confectionery mass, produced by the method of the invention, having the desired final total solids content, can be formulated to set quickly at a relatively low temperature. Thus, the method of the invention allows the confection to be quickly shaped and avoids having to use the lengthy starch powdered molding technique. Thus, the invention reduces, or in some cases even eliminates, the need to use starch molding. This simplifies the process and reduces the need for equipment, such as drying stoves, and the need for storage areas to further dry the product. The method of the invention also avoids problems associated with single phase cooking such as the problems that result from the extreme increase in viscosity when hydrocolloid confectionery mixes, such as those containing starch, are cooked in a single step to the final total solids. Furthermore, a wide range of compositions can be used in the method of the invention.

It is also preferable, particularly for starch-containing confections, that the method includes a step to hydrate and precook the slurry under high pressure before the slurry is concentrated. In contrast to other hydrocolloids that functionalize on dissolution, starch generally requires a more demanding thermal treatment to gelatinize and, thus, typically requires an extra gelatinization step. The starch may be cooked or gelatinized by any means available to those of ordinary skill in the art. Preferably, precooking involves injecting steam directly into the slurry at a pressure ranging from about 2 to 5 bars for a short time, typically between about 1 to 15 seconds, preferably between about 2 to 5 seconds, so as to raise the temperature of the slurry to at least about 110° C., typically between about 110° C. to 150° C. preferably between about 120° and 130° C. Pressure and temperature levels are adjusted to sufficiently moisten the starch and cause the starch granules to gelatinize.

The method may further include adding an additional amount of hydrocolloid after the ingredients are pre-cooked. The additional hydrocolloid can be added, for example, between the two cooking phases. Alternatively, the hydrocolloid can be added between the pre-cooking and the cooking operations. For example, when gelatin is the hydrocolloid that is added it may be added between the two cooking phases, since there is no need to have gelatin undergoing a precooking stage when gelatin is mixed with other hydrocolloids. Adding gelatin at a late stage, i.e, after pre-cooking, is preferred since this minimizes the problems of the gelatin degrading as is commonly encountered with traditional methods.

Preferably, the sugar-hydrocolloid mass is concentrated to a solids content of at least about 75 percent, preferably at least about 80 percent, more preferably at least about 85 percent, and most preferably between about 85 and 90 percent. Unexpectedly, it has been discovered that the method of the invention is suitable for making sugar-based products that were traditionally only shaped in starch powdered molds. According to the invention, however, any molding technique including, but not limited to, casting, depositing, injection, layering, and extrusion can be used to shape the products. Preferably, the sugar-based mass is formed into a plurality of individual confections by passing it through a set of chilled forming rollers.

The apparatus for carrying out the method of the invention is illustrated in the FIG. 1. The apparatus comprises a scrape evaporator 4 and feeding means to deliver a mix of confectionery ingredients to the inside of the scrape evaporator. The scrape evaporator 4 is divided into at least two evaporation sections. Typically, there are two evaporation sections, an upper cooking section and a lower cooking section 40 and 42, respectively. Each section has their own specific shape and/or heating characteristics and each has a distinct set of scraping elements. The scrape evaporator subjects the slurry to a series of sequential evaporating processes to reach the desired solids content. At least two separate evaporation stages occur. This unique arrangement allows the evaporating conditions, particularly the heating and mechanical conditions, to be carefully controlled as the viscosity of the confectionery mass gradually changes as moisture is lost. By controlling the evaporating conditions as the confectionery mass passes through the apparatus the desired level of final solids can be obtained without the apparatus becoming blocked.

The ingredients to make a confectionery mix, such as water, carbohydrates (or sugars), and hydrocolloids (or gums) are delivered to the storage hopper 10. The ingredients may be added while they are cold or alternatively after they have been preheated to favor the dissolution. The storage hopper 10 includes mixing means to provide a substantially liquid confectionery mix in the form of a slurry or syrup.

The slurry is transported to a pre-heating apparatus such as a plate heat exchanger 20 by means of a pump 15. The slurry is gradually heated to reach a temperature sufficient to completely dissolve the soluble ingredients, in particularly sugar. In general, the slurry is heated to a temperature at about 90° C. for about 60 seconds. The temperature and time are limited as a function of the recipe to avoid degradation of sensitive ingredients and/or premature gelatinization of starch (when starch is an ingredient in the slurry). The slurry is then delivered from the pre-heating device to pre-cooker 30 that may be, for example, a jet cooker 30 where steam is injected directly into the slurry. The pre-cooking phase is necessary for some hydrocolloid containing slurries. In particular, pre-cooking is necessary for starch containing slurries, the pre-cooking phase is necessary to properly gelatinize the starch granules by hydration. During this pre-cooking phase the pressure typically ranges from about 2 to 5 bars and the temperature typically ranges from about 110 to 150° C. for about 1 to 15 seconds.

Preferably, a marginal amount of the slurry from the preheating phase or the pre-cooking phase is redistributed into the mixing hopper 10 to facilitate the dissolution of the solid ingredients that are placed in the hopper 10 to make the slurry. The pre-cooked slurry is then delivered, under pressure, to the internal evaporation housing.

The pre-cooked slurry is delivered under pressure to a scrape evaporator 4 which is arranged to provide a controlled and gradual increase in the solid content of the slurry. The pressurized slurry is deposited onto an upper cooking section 40 of the scrape evaporator 4. The slurry is sprayed using a nozzle arrangement 44 that is oriented to directly deposit the slurry on the inner surface of the upper cooking section 40. For example, the nozzle arrangement may comprise a plurality of nozzles, each one aimed at the inner walls of the upper cooking section 40 in different directions to form a film of the slurry evenly distributed on the surface of the upper cooking section 40. The upper cooking section 40 has a substantially cylindrical shape and has a relatively large diameter so as to provide a large evaporation area. The excess moisture is evacuated to the atmosphere through the top of the dome-shaped upper end of the evaporator. The inner surface of the upper cooking section is scraped by independent scrapers 45 whose dimensions, i.e., length and radius, are properly adapted to the size of the upper cooking section. The scrapers 45 are mounted and secured to a central shaft that extends along the height of the evaporation housing. The central shaft arrangement is driven by a motor located at the top of the evaporating housing.

The scraping motion forces the slurry downwards into an intermediate section 41 that has a substantially conical configuration that permits the film of the slurry to flow onto the surface of the lower cooking section 42. The slope of the intermediate section 41 advantageously permits the flow of the slurry film to slow down so that the temperature of the slurry can be monitored. The intermediate section 41 also has a set of scrapers 46 adapted to its geometry and size. Cooking does not take place while the slurry is in the intermediate section 41. The temperature of the passing slurry, however, can be conveniently monitored at this point. By the time the slurry reaches the intermediate section 41 the majority of the moisture has been removed from the confectionery mix. If needed, additional additives such as hydrocolloids, especially temperature-sensitive hydrocolloids; coloring agents; and/or flavoring agents can be added in the intermediate section 41. For example, it is advantageous to add gelatin at this point in the process.

The slurry then passes down to the lower cooking section 42 of the scrape evaporator. The lower cooking section 42 is also substantially cylindrical and includes a properly adapted set of scrapers 47. The diameter of the lower cooking section 42, however, is substantially less than the diameter of the first upper cooking section 40. Generally, the diameter of the lower cooking section 42 is about 20 to 60 percent less, preferably 40 to 50 percent less than the diameter of the upper cooking section 40. In the lower cooking section 42 the more viscous slurry is further heated to a higher temperature and centrifugally scraped at a shearing rate that is properly selected for the higher viscosity. The shearing rate is selected so that it will not spoil the hydrocolloid functionality realized in the previous sections of the apparatus. Sufficient moisture is evaporated in the lower cooking section 42 to result in a confectionery mix having the desired final solids content. Gelatin can also be added to the slurry while it is in the lower cooking section 42. Steam, corresponding to the excess evaporated water, rises upward during the cooking process and is vented to the atmosphere through the top of the cooker dome. The intermediate section, discussed above, is optional. Thus, in another embodiment the slurry is urged from the surface of the upper cooking section directly onto the surface of the lower cooking section.

In a preferred embodiment, the upper cooking section 40 is maintained at a temperature range that is lower than the temperature range of the lower evaporation section 42. Therefore, the slurry experiences a first gentle heating phase in the upper cooking section 40 to remove some of the excess moisture, followed by a second stronger heating phase in the lower cooking section 42 to remove additional moisture to reach the desired total solid content.

Preferably, the scrape evaporator 4 is provided with means for creating a reduced pressure in the scrape evaporator 4. This promotes rapid and efficient removal of the moisture and facilitate venting the moisture to the atmosphere. Reduced pressure reduces the residence time of the confectionery mix in the scrape evaporator 4. This minimizes sugar inversion and, when hydrocolloids are present in the confectionery mix, the breakdown of the hydrocolloids. It is preferable that the scrape evaporator 4 is under reduced pressure if heat-sensitive hydrocolloids are used in the confectionery mix since reduced pressure allows lower temperatures to be used.

Preferably, thermocouples are provided at regular intervals along the evaporator, in particular, at each distinct section to allow the temperature to be carefully monitored and to accurately and precisely control and regulate the temperature.

The lowermost portion 43 of the scrape evaporator 4 has a tapered configuration in which a helicoidal rotary means 48 is installed to help urge the viscous mass toward the exit of the evaporator. Preferably, the helicoidal rotary means is a spiral ribbon auger. It may be necessary to provide additional scrapers positioned below the auger (not illustrated) to prevent the concentrated slurry from sticking to the outlet of the scrape evaporator.

During the concentrating operation within the scrape evaporator 4, the shearing rate that is applied to the confectionery mass is varied depending upon the recipe and the viscosity of the slurry. The shearing rate is varied by varying the rotation speed of the scraping elements in the evaporation housing during the concentration process. The scraping elements in the different sections of the apparatus can be run at the same speed or at different speeds with respect to each other. In general, the speed is adjusted to obtain a shear rate in each section of the evaporation housing that is suitable for each particular recipe and the viscosity of the slurry. Thus, the apparatus can handle the wide range of viscosities that are encountered with confectionery slurries. Slower rotation speeds are generally used for more viscous confectionery slurries. Typically, the rotation speed, expressed as the velocity of the scraping elements is between about 1 and 15 meters/second, preferably between about 3 and 10 meters/second.

By using two cooking cycles and the scrape evaporator the method of the invention removes moisture from the confectionery mix more rapidly than prior art methods and mixes the slurry more effectively than prior art methods that use a single cooking phase that is not adapted to handle the changes in viscosity that takes place as the confectionery-based slurry is concentrated. As a result the cooking time is shorter and ingredients in the confectionery mix are less likely to be degraded. By using different shear rates in the upper cooking section and the lower cooking section (where the slurry is more viscous) allows moisture to be efficiently removed from the slurry and allows the slurry to pass through the evaporation housing without clogging the apparatus.

Located at the exit of the evaporator there may be a withdrawal pump 50 that continuously feeds the viscous mass into an inline mixing device 6. The pump is also provided with a vacuum seal should evaporating under reduced pressure be desired. The mixing device 6 allows additional additives such as coloring and/or flavoring agents to be added to the viscous mass before the molding operation The viscous confectionery slurry is then transported to the forming device 7. Preferably, the forming device consists of a set of chilled rollers 70 comprising a series of die sections that provides the final shape to the confectionery products. The confections are cooled during forming while passing through the chilled rollers. Any forming or molding device, however, may be used without departing from the scope of the invention. For example, die plates could replace the rollers or the molding device could comprise a combination of a depositor and a series of molds. The confectionery products can be formed as individually molded products or may be extruded as a continuous rope, film, or sheet of confections.

After forming the confections into the desired shape the confection may be further cooled. For example, the confection may be placed on a conveyor that passes the confectionery product through a cooling tunnel 81 in which a cooling means 8 such as a liquid gas, for example, liquid nitrogen, is sprayed directly on the conveyor means. Air-cooling can also be used. The type of cooling depends upon such things as the ingredients, setting conditions, flow capacity, and the like and may be readily determined by one of ordinary skill in the art.

For carefully selected and formulated systems of hydrocolloids the method of the invention produces a confectionery slurry that sets quickly at the low temperature of the forming device to provide a product having the desired properties. The method of the invention eliminates the need to use drying stoves and the need for large storage areas that are generally required in plants that use the Mogul process.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. An apparatus for manufacturing a concentrated confectionery slurry comprising a scraped-surface evaporator that has a height, substantially cylindrical upper and lower cooking sections, a tapered collection section and an outlet, with the upper cooking section having a first surface at a first temperature for receiving a confectionery-based slurry, first scrapers to remove the slurry from the first surface and urge the slurry towards the lower cooking section, the lower cooking section having a second surface at a second temperature, second scrapers to remove the slurry from the second surface and urge the slurry to the collection section, helical rotary means to urge the slurry out of the outlet, a central shaft that extends along the height of the scrape evaporator and to which the first and second scrapers are secured, and means for controlling the temperature of the upper and lower cooking sections.

2. The apparatus of claim 1 further comprising a hopper for mixing ingredients of a confectionery mix with water to provide the confectionery-based slurry, and means to deliver the confectionery-based slurry from the hopper to the scrape evaporator.

3. The apparatus of claim 1, wherein the upper cooking section has a diameter that is larger than that of the lower cooking section.

4. The apparatus of claim 1, wherein the temperature of the first surface is lower than the temperature of the second surface.

5. The apparatus of claim 1, wherein the temperature of the first surface is higher than the temperature of the second surface.

6. The apparatus of claim 1, wherein the temperature of the first surface and the second surface is between about 50 and 150° C.

7. The apparatus of claim 6, wherein the first surface is at a temperature between about 90 and 110° C. and the second surface is at a temperature between about 100 and 120° C.

8. The apparatus of claim 6, wherein the first surface has a temperature of between about 95 and 115° C. and the second surface has a temperature of between about 105 and 150° C.

9. The apparatus of claim 1, wherein the slurry is delivered to the scrape evaporator by a jet sprayer that directs the slurry onto the first surface of the upper cooking section.

10. The apparatus of claim 1, further comprising a substantially conical intermediate section between the upper cooking section and the lower cooking section having a third surface and third scrapers to remove the slurry from the third surface and urge the slurry towards the collection section.

11. The apparatus of claim 10, wherein the intermediate section is designed to allow additional additives to be added to the slurry.

12. The apparatus of claim 1, further comprising a pre-heating apparatus between the hopper and the scrape evaporator to heat the slurry to a temperature that ensures that the confectionery slurry is a solution.

13. The apparatus of claim 12, further comprising a starch cooker between the pre-heating apparatus and the scrape evaporator at a temperature between about 110° C. and 150° C. and a pressure of between about 2 and 5 bars to gelatinize starch in the slurry.

14. The apparatus of claim 1, wherein the helical rotary means is a ribbon auger.

15. The apparatus of claim 1, further comprising a pump to move the slurry from the outlet of the scrape evaporator to an in-line mixing device for mixing one or more additional additives into the slurry.

16. The apparatus of claim 1, wherein the scrape evaporator is operated under reduced pressure.

17. The apparatus of claim 1, further comprising a set of chilled rollers to shape the slurry into individual confectionery products.

18. The apparatus of claim 1, further comprising a device to deposit the slurry in a plurality of molds.

19. The apparatus of claim 18, further comprising a conveyor belt to receive the molds and further comprising chilling the molded product by spraying a coolant under the conveyor belt as the molds move therealong.

* * * * *